Oct. 16, 1951 E. K. CLARK 2,571,111
SPACED WALL CONTAINER WITH REMOVABLE INNER RECEPTACLE
Filed Jan. 13, 1948 2 Sheets-Sheet 1

WITNESSES:

INVENTOR
EARL K. CLARK
BY
ATTORNEY

Oct. 16, 1951  E. K. CLARK  2,571,111
SPACED WALL CONTAINER WITH REMOVABLE INNER RECEPTACLE
Filed Jan. 13, 1948  2 Sheets-Sheet 2

WITNESSES:
Frank Costain
E. H. Lutz

INVENTOR
EARL K. CLARK
BY R. J. Eisinger
ATTORNEY

Patented Oct. 16, 1951

2,571,111

UNITED STATES PATENT OFFICE 2,571,111

SPACED WALL CONTAINER WITH REMOVABLE INNER RECEPTACLE

Earl K. Clark, Mansfield, Ohio, assignor to Westinghouse Electric Corporation, East Pittsburgh, Pa., a corporation of Pennsylvania Application January 13, 1948, Serial No. 2,117

1 Claim. (Cl. 220—17)

This invention relates to cooking devices and, more particularly, to an electrically-heated roaster.

In a conventional electrically-heated roaster construction, as shown in Fig. 4 of the drawings, the flanged edge of the inset pan overlies the upper edge of the roaster body and extends outwardly therefrom to provide a finger grip to facilitate removal of the inset pan. Since the inset pan, which is one of the hottest portions of a roaster, has a portion of its flange exposed to the atmosphere, some heat is lost by radiation in this way. Furthermore, two part lines are presented to the observer, thereby detracting from the appearance of the roaster and necessitating finishing the inset pan in the same color of vitreous enamel as used for the baked enamel outer casing.

It is, therefore, an object of this invention to provide a roaster having an inset pan which, although easily accessible for removal, is nevertheless completely enclosed, thereby reducing heat loss to the surrounding atmosphere.

Another object is to provide a roaster having only one external part line defined by the roaster body and its mating cover while still allowing food vapors condensing on the inner face of the cover to return to the inset pan or to the inner casing.

A further object is to provide a roaster whose capacity can be easily substantially increased above its normal capacity without the use of additional parts.

These and other objects are effected by my invention as will be apparent from the following description and claim taken in connection with the accompanying drawings, forming a part of this application, in which:

Figure 1:
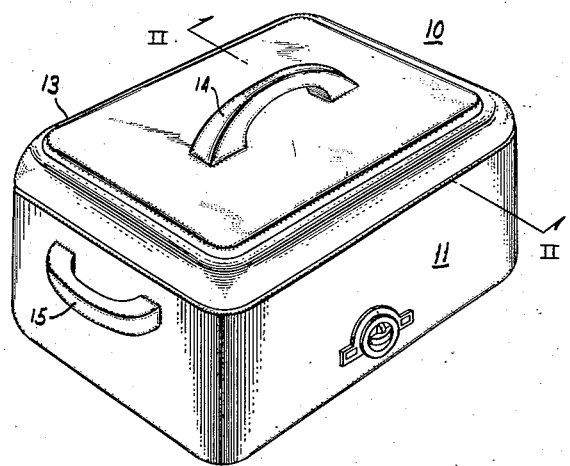
Fig. 1 is a perspective view of my improved roaster.
Figure 2:
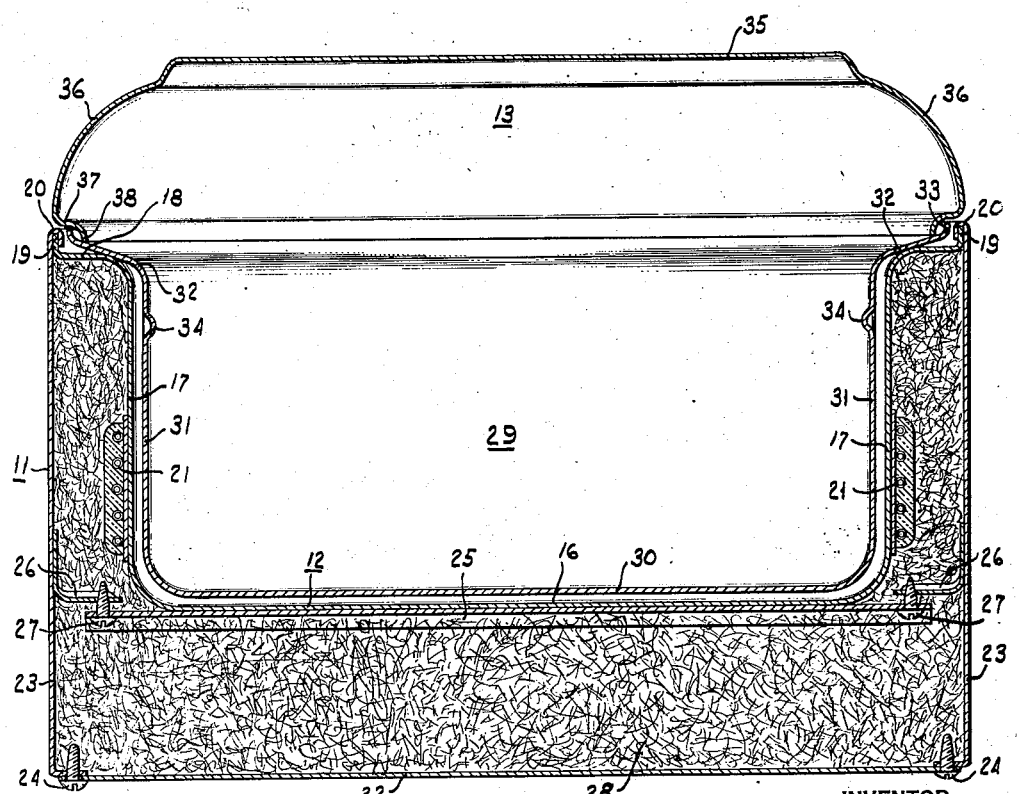
Fig. 2 is a cross section taken on line II—II of Fig. 1.

Referring to the drawings, I show an electric roaster generally designated 10 having a body comprising an outer casing 11 and inner casing or well 12 and closed by a cover 13 which may be detachably hinged to the outer casing, if so desired, in any well-known manner. The cover has a handle 14, preferably composed of heat insulating material to facilitate opening of the roaster. The outer casing may have a plurality of handles 15 (only one shown) to provide carrying means.

The inner casing or well 12 has a bottom 16 and vertical walls 17 in spaced relationship with the outer casing. The upper portions of the inner casing walls are bent outwardly to form a flange 18 and upwardly at 19 where they are fastened to the outer casing 11 by a rolled edge 20 of the outer casing 11 to provide a unitary structure. A conventional electrical heating element 21 is wrapped about the outer surface of the inner casing walls 17 in any well-known manner for heating the inner casing for cooking purposes.

The outer casing 11 is shown as having a bottom wall 22 attached to a vertical wall 23 by screws 24. The inner casing 12 is supported by a bottom support member 25. For this purpose, the outer casing wall 23 carries a plurality of angle plates 26 to which the support member is fastened by means of screws 27. Heat insulating material 28, such as glass wool, may be placed between the inner and outer casing walls to reduce heat loss to the atmosphere.

Within the inner casing and nesting therein is disposed a removable inset pan 29 in which food to be cooked is placed. This pan is provided with a bottom 30 and vertical walls 31. The upper portions of the inset pan walls are bent outwardly to form a flange 32 and upwardly to form a lip 33. A plurality of inwardly embossed portions 34 are horizontally disposed in the upper portion of the inset pan walls 31. These embossed portions are formed in two opposite inset pan walls and are provided to facilitate removal of the inset pan 29 for cleaning purposes. When the inset pan is lifted a short distance out of the well 12 the outwardly extending flange 32 may be utilized for handle purposes.

The cover 13 has a top wall 35 and outwardly convex side walls 36 projecting downwardly to form a substantially flush exterior surface with the outer casing 11. The lower portions of the cover side walls are bent inwardly and downwardly to form a flange 37 having a downwardly-extending lip 38 which is adapted to enter the inset pan 29 and to be supported by the inset pan flange 32 at a point adjacent to the inset pan flange lip 33. It may now be seen that any food juices or vapors which condense within the cover will run along the inset pan flange 32 and return to the inset pan 29, thus preventing loss of these juices to the atmosphere. Also, the inset pan flange lip 33, by being disposed within the space formed by the cover flange 37 and the rolled edge 20, is neatly concealed from view of the observer and does not come into contact with the surrounding atmosphere. Heat loss is thus substantially reduced and the heat produced by the heating element 21 is efficiently utilized. Furthermore, only one external part line is presented to the observer, namely, that between the cover and the outer casing.

Figure 4:
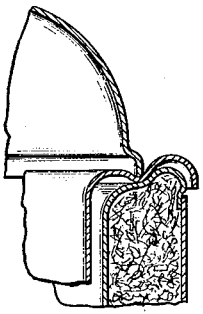
Fig. 4 is a fragmentary cross-section of a conventional construction.

In the conventional construction shown in Fig. 4, it is accepted practice to coat the outer casing with a light colored enamel to improve the external appearance of the roaster. Since the inset pan flange is exposed, it is necessary to coat the entire inset pan with a light colored vitreous enamel in order to match the outer casing and also withstand the cooking temperatures. This procedure entails two coats of enamel and is expensive.

In my improved construction, in accordance with accepted practice, I also coat the outer casing with a light colored enamel. However, since the inset pan is wholly concealed, I eliminate the costly two-coat light colored vitreous enamel and apply instead a single ground coat of vitreous enamel. A saving in labor and material is thus effected.

Figure 3:
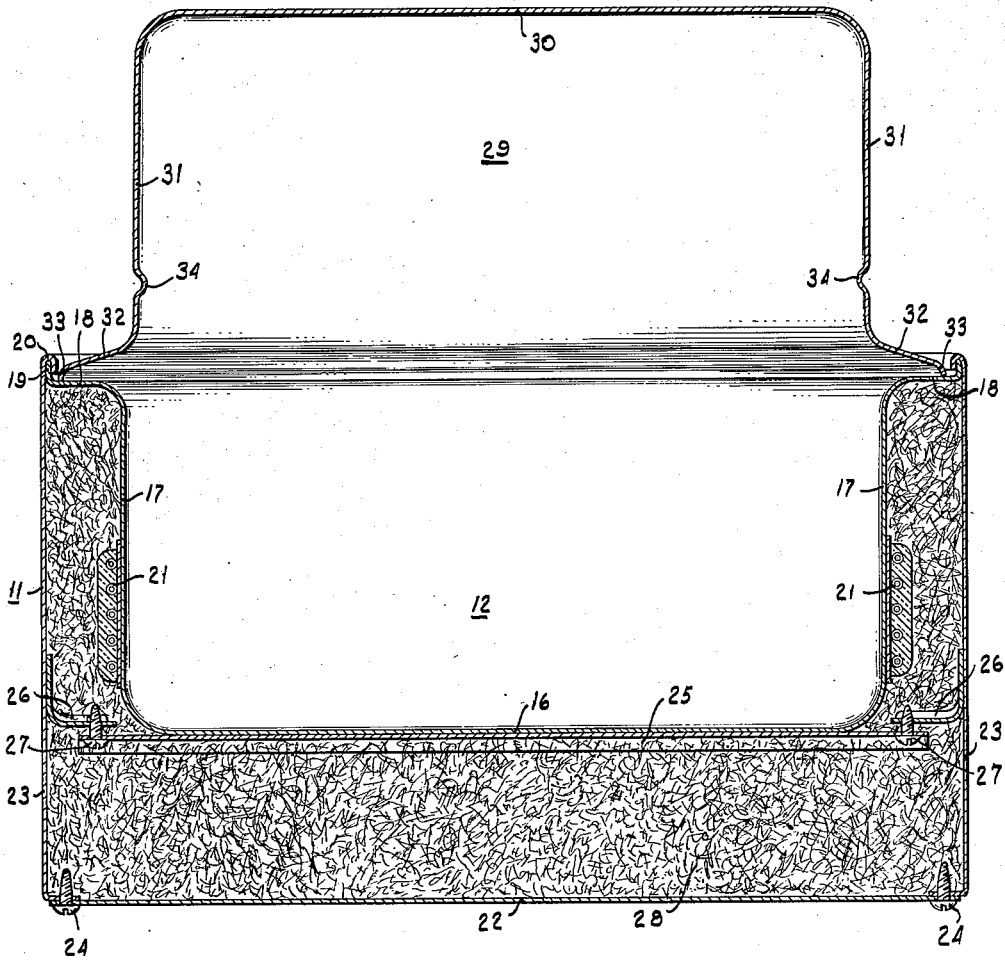
Fig. 3 is a transverse section of the roaster with the cover removed and the inset pan inverted and acting as a cover.

Although the roaster above described may be utilized to cook a diversity of foods by means of a plurality of trays placed within the inset pan, or by making use of the well per se for cooking roasts and fowl, its volume available may be substantially increased above normal, as shown in Fig. 3. In roasting large fowl or roasts of meat, the cover 13 and the inset pan 29 may be removed completely and the roast charge placed directly within the well 12. The inset pan is then placed in an inverted position upon the well. It is well supported in this position by its flange portion 33 abutting the well flange 18. The inset pan 29 now acts as a deep cover and has the same utility as the cover 13. Any food juice vapors which condense on the inner surfaces of the inset pan will flow down to the well flange 18 whence they will be directed back into the well 12, thus preventing undue drying of the roasting charge. Removal of the inset pan for periodic inspection or removal of the roast charge is accomplished by the use of padded pot holders which are standard equipment in any kitchen.

While I have shown my invention in but one form, it will be obvious to those skilled in the art that it is not so limited, but is susceptible of various changes and modifications without departing from the spirit thereof.

What I claim is:

A substantially rectangular cooking receptacle comprising an open top body having an outer casing and an inner casing, an inset pan nested within said inner casing, and a cover, said outer casing including bottom and vertical walls, said inner casing comprising a bottom wall and vertical walls disposed in spaced relation to the corresponding walls of the outer casing, the vertical walls of the inner casing being bent outwardly to form seating flanges and then upwardly and seamed to the top edges of the vertical walls of the outer casing, said inset pan including a bottom wall, vertical walls, and a flange extending outwardly and upwardly from the top of the vertical walls and terminating in an upwardly extending free edge disposed inwardly of the vertical walls of the outer casing, said cover including a top wall, an outwardly convexed curved marginal portion the lower portion of which is disposed adjacent to and in substantial alignment with the vertical walls of said outer casing to provide an unbroken smooth contour with the same, said cover further having a flange integral with the lower edge of said curved marginal portion and extending therefrom inwardly over the top edge of said inset pan flange and also extending therefrom downwardly and terminating in a free edge so that condensates forming on the inner surface of said cover may drain into said inset pan.

EARL K. CLARK.

REFERENCES CITED

The following references are of record in the file of this patent:

UNITED STATES PATENTS

| Number | Name | Date |
|---|---|---|
| 1,300,712 | Ferdon | Apr. 15, 1919 |
| 2,217,804 | McCormick | Oct. 15, 1940 |
| 2,338,455 | Petri | Jan. 4, 1944 |
| 2,414,868 | Gunther | Jan. 28, 1947 |